(No Model.) 4 Sheets—Sheet 1.

L. H. NASH.
IGNITOR AND SUPPLY VALVE FOR GAS ENGINES.

No. 386,216. Patented July 17, 1888.

(No Model.) 4 Sheets—Sheet 2.
L. H. NASH.
IGNITOR AND SUPPLY VALVE FOR GAS ENGINES.

No. 386,216. Patented July 17, 1888.

Witnesses:
A. Lockhart.
W. E. Stearns.

Inventor:—
Lewis Hallack Nash,
by Johnson & Johnson
Attys.

(No Model.) 4 Sheets—Sheet 3.
L. H. NASH.
IGNITOR AND SUPPLY VALVE FOR GAS ENGINES.
No. 386,216. Patented July 17, 1888.
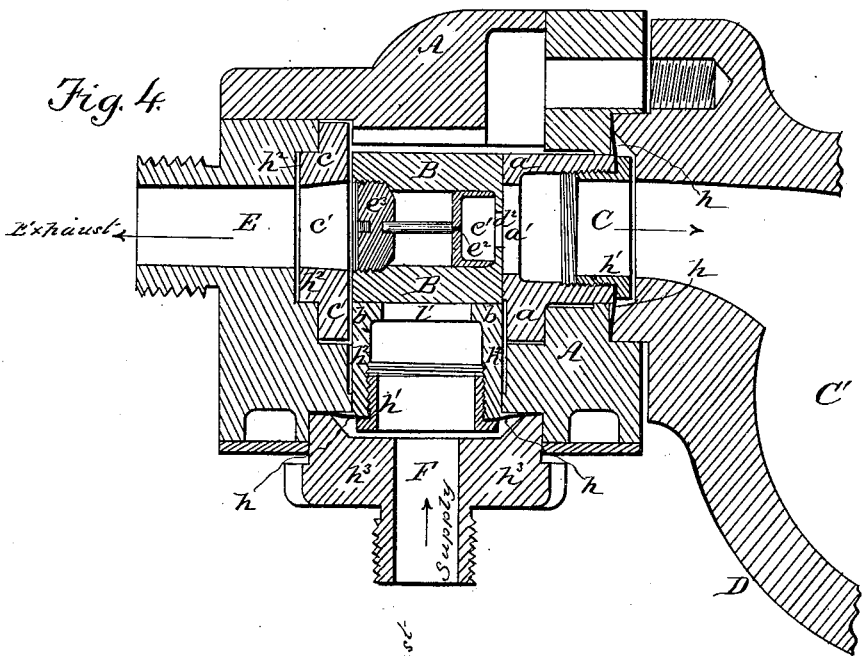
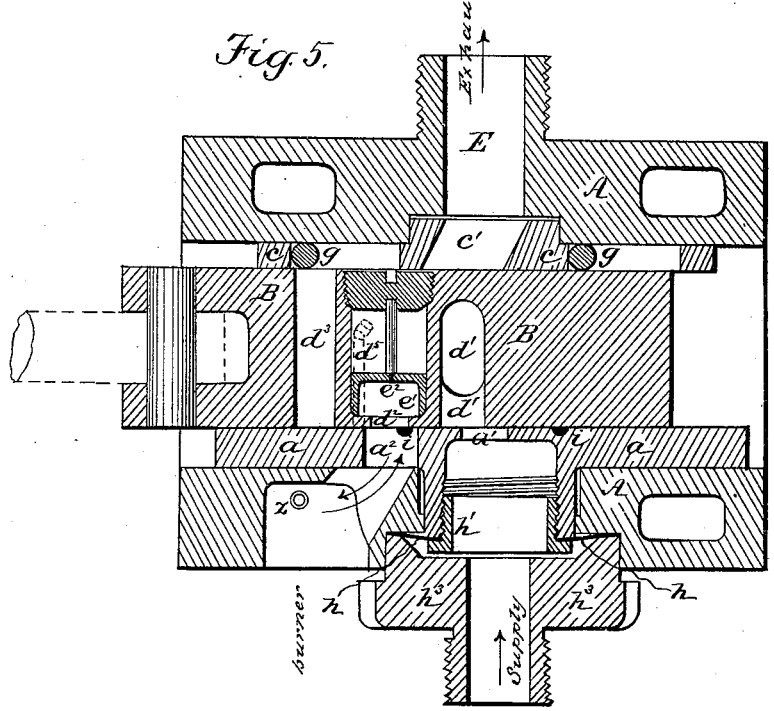
Witnesses:-
Inventor:-
Lewis Hallock Nash,
by Johnson and Johnson,
Atty.

(No Model.) 4 Sheets—Sheet 4.
L. H. NASH.
IGNITOR AND SUPPLY VALVE FOR GAS ENGINES.
No. 386,216. Patented July 17, 1888.
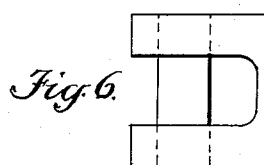
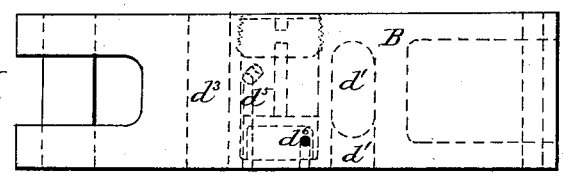
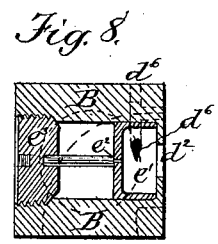
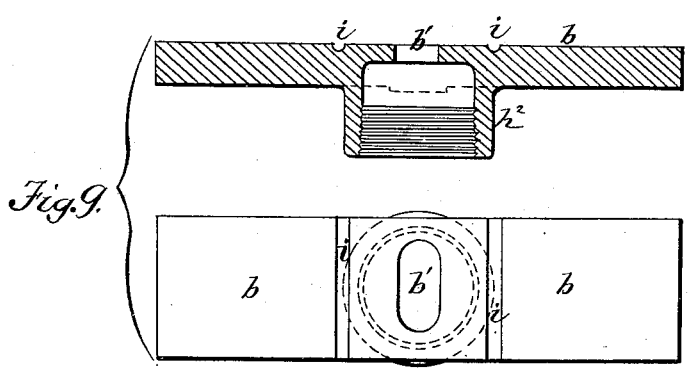
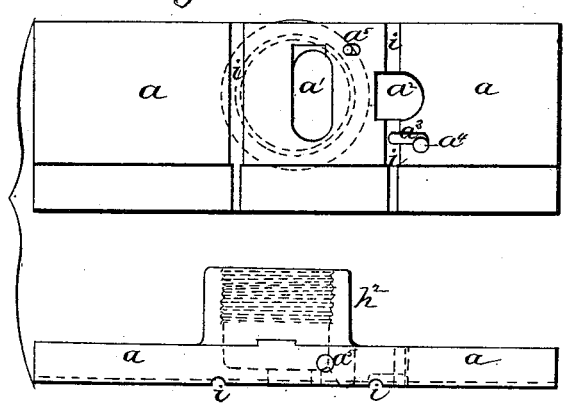
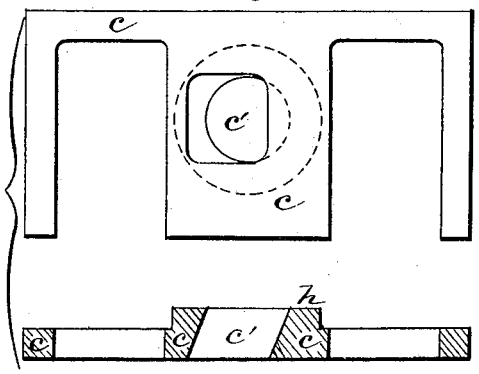
Witnesses:
A. Lockhurt,
W. E. Stearns.
Inventor:—
Lewis Hallock Nash,
by Johnson and Johnson,
Attys.
N. PETERS, Photo-Lithographer, Washington, D. C.

United States Patent Office.

LEWIS HALLOCK NASH, OF BROOKLYN, ASSIGNOR TO THE NATIONAL METER COMPANY, OF NEW YORK, N. Y.

IGNITOR AND SUPPLY-VALVE FOR GAS-ENGINES.

SPECIFICATION forming part of Letters Patent No. 386,216, dated July 17, 1888.

Application filed August 4, 1885. Renewed July 14, 1887. Serial No. 244,262. (No model.)

*To all whom it may concern:*

Be it known that I, LEWIS HALLOCK NASH, a citizen of the United States, residing at Brooklyn, in the county of Kings and State of New York, have invented new and useful Improvements in Supply-Valves for Gas-Engines, of which the following is a specification.

The objects of my improvements are to reduce the friction and wear of a supply slide-valve for gas engines; to adapt the valve for automatically maintaining a tight joint on its seat; to employ the working-fluid in the supply-passage and cylinder-passages as the means of obtaining a tight joint for the valve; to provide for admitting the charge, igniting the same, and discharging the waste gases in a single valve having ports of simple and compact arrangement, which, in a gas-engine, gives a very small valve of large capacity of ports compared with the size of the valve, and to provide an igniting device which will light the charge under all conditions in the working of the engine or velocity of the force-jet. A valve and igniting device constructed to accomplish these objects are shown in the accompanying drawings, in which—

Figure 1:
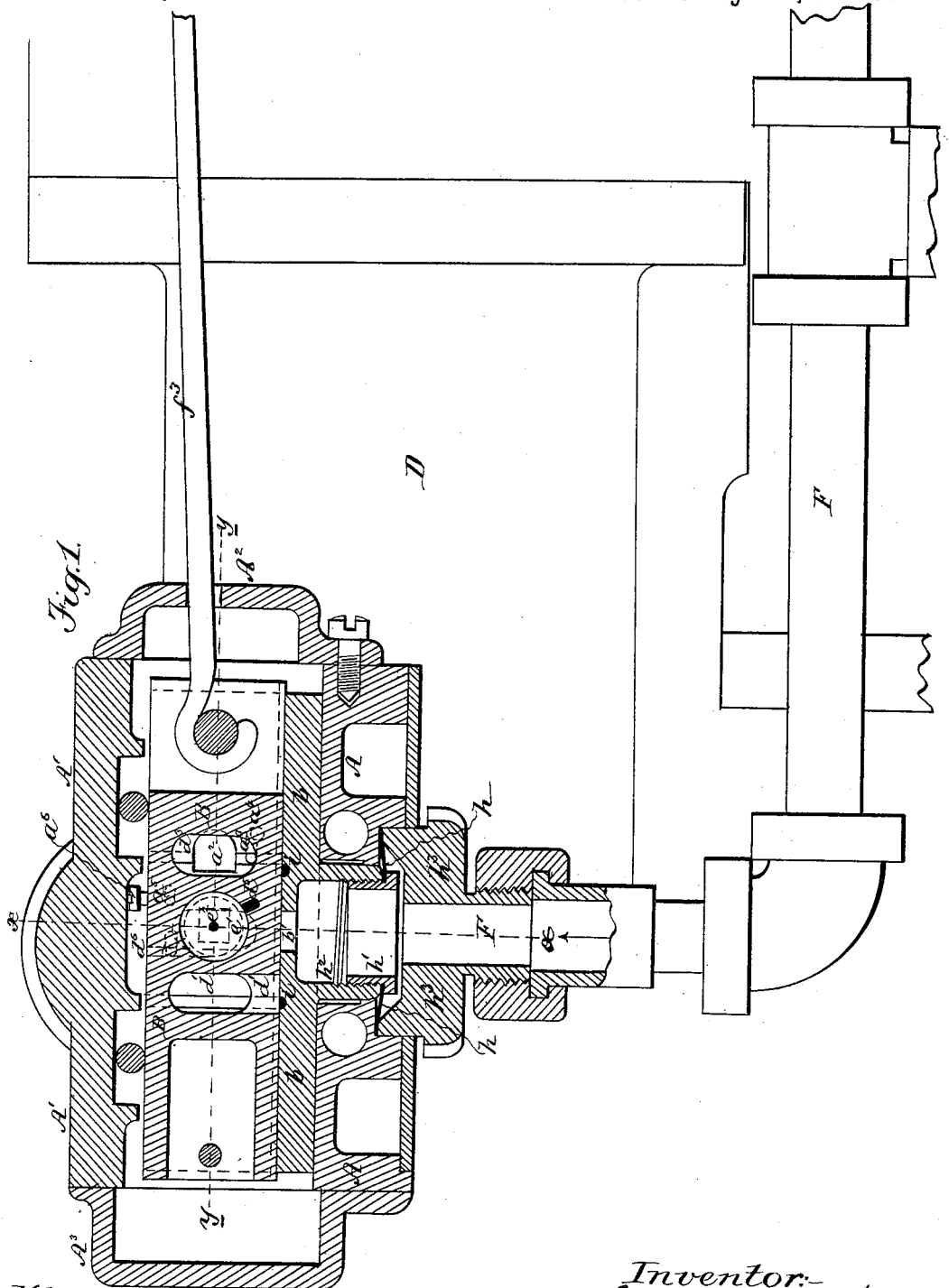
Figure 2:
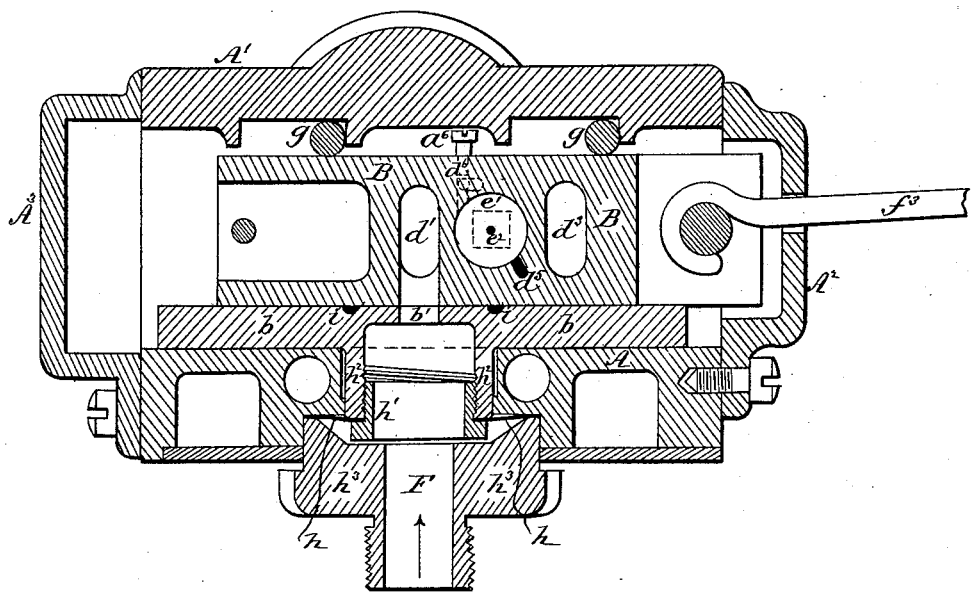

Figure 1 represents in vertical longitudinal section a slide-valve embracing my invention, the valve being shown in the position it occupies at the moment of the ignition of the charge. Fig. 2 represents a similar view showing the valve in position to admit the charge into the cylinder, and Fig. 3 a similar view showing the valve in the position to discharge the waste gases from the cylinder. Fig. 4 represents a vertical cross-section of the valve, taken on the line $x$ $x$ of Fig. 1, particularly showing the relation of the igniting-chamber to the combustion-chamber. Fig. 5 represents a horizontal section on the line $y$ $y$ of Fig. 1, particularly showing the relation of the igniting-chamber to the permanent gas-burning jet. Figs. 6, 7, and 8 represent, respectively, the top and side and a cross-section of the valve, the section being on the line $x'$ $x'$ of Fig. 7. Fig. 9 represents in top and vertical section the bottom bearing-seat. Fig. 10 represents in side and top views the bearing-seat next to the cylinder. Fig. 11 represents in section and top view the bearing-seat next to the exhaust.

My invention is directed, among other things, to the supply-valve, which may be used in any gas-engine in which the charge is ignited by an ignition-chamber; but the provision of valve-bearing seats to reduce friction and wear may be applied to any slide-valve.

In Fig. 1 I have shown the valve organization in section and the engine-cylinder D in elevation, and it will be understood that the valve can be placed in any desired relation to the cylinder, and operated by suitable connecting mechanism, of which $f^3$ is a part.

The valve B is of rectangular form in cross-section inclosed in a case, A, having a top cover, A′, and end covers, $A^2$ $A^3$. The valve has bearing-faces upon three sides only containing ports, which latter pass through the valve. A distinctive feature of my valve is an arrangement of ports and igniting-chamber by which I obtain the advantage of a small and compact valve; first, by using three faces of the valve for bearing-faces, one face operating the cylinder-port $a'$, as shown in Fig. 4, one face operating the supply-port $b'$, and one face operating the exhaust-port $c'$, as shown in Fig. 4; second, by placing the igniting or jet chamber $e'$ of the valve between the supply and discharge ports $d'$ $d^3$, as shown in Fig. 1. The valve has three main ports—an inlet-port, $d'$, opening communication between the inlet-port $b'$ and the cylinder-port $a'$, an interior lighter-port, $d^2$, opening into the lighter-chamber $e'$, and operating, in connection with the external lighter-port $a^2$, Figs. 4 and 5, and the cylinder-port $a'$, to ignite the charge, and a port, $d^3$, opening communication between the cylinder-port $a'$ and the exhaust-port $c'$. It also has two other ports—a supply-port, $d^6$, Fig. 6, for the jet-chamber $e'$, operating, in connection with port $a^5$, to supply-gas to the lighter-chamber, and an outlet-port, $d^5$, communicating with the jet-chamber, operating, in connection with outlet-port $a^3$, Figs. 1 and 10, to discharge the waste gases from said chamber.

To protect the valve B from direct contact with the flame in the lighter-chamber, I form such chamber by a cup set in the valve containing the ports $d^2$ $d^6$, Fig. 8, and a small back port, $e^2$, arranged to communicate with the outlet-port $d^5$, as stated. The cup-chamber is set in an opening in the valve, said opening being closed by a screw-plug, $e^3$, which by a stem serves also to support the igniting-chamber in its proper position. My invention also embraces an ignition-chamber of improved construction. This chamber is of preferably circular form, and its supply-port $d^6$ is tangential to the chamber-wall, as seen in Figs. 1, 2, 3, and 7, and is so located for the important purpose of forming a burner which cannot be extinguished by variations in the pressure of the supply, and which will, under all conditions in the working of the engine, insure the ignition of the charge. I find in practice that a jet of gaseous mixture which is caused to traverse a chamber in a circular path will burn in said chamber with a rapidly-rotating flame, that it will remain lighted under very great variations in the velocity and pressure of the supply-jet, and that it will be more permanent than any other form of interior igniting-jet hitherto used. My invention applies this principle in the construction of a lighter device for a gas-engine, and the use of such an igniting-chamber is not dependent upon the particular construction of valve shown, or its use in the valve, as it may be used in connection with ignitors independent of the valve.

It is not necessary that the ignition-chamber should be circular, or that the jet-port communicating therewith should be tangential, since any form of chamber and relation of jet may be employed which will cause the inrushing gas to revolve about said chamber, substantially as shown. The ignition-port $d^2$ of this chamber should be smaller than the chamber $e'$, so that the gas entering the latter at its side will impinge upon its circular walls and be directed thereby in a rapidly-rotating flame-jet and effect the ignition of the charge through the port $d^2$; but in its circular course in the chamber it maintains a compact body holding the flame with constancy within the ignition-chamber $e'$, ready at all times and under all conditions to make the ignition in the operation of the valve. The operation of lighting the gas in the chamber $e'$ takes place at every complete movement of the valve.

My improved igniting device may be used with any form of engine-valve, as well as that here described, or it may be employed independent of the engine-valve, if preferred.

Figure 3:
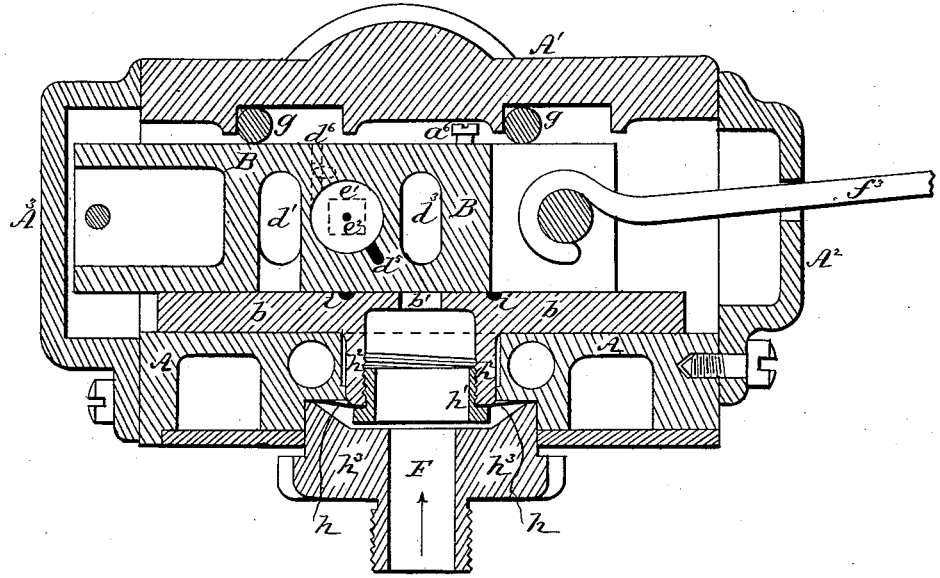

I have described the valve as having three port-faces, and these I have provided with self-adjusting bearing seat-plates $a\ b$, which contain the case ports operated by the valve. These bearing seat-plates $a\ b$ are of sufficient length to form good bearings for the whole length of the valve on the inlet and cylinder port-faces. The two other sides of the valve bear upon rolls $g$, fitted in recesses in the case, as shown in Figs. 1, 3, and 5, so as to have a limited rolling range. These seat-plates are each formed with a hollow extension or plunger, $h^2$, surrounding the ports $a'\ b'$, and enter corresponding recesses in the case A, so as to expose the area of this extended surface around the ports to the pressure of the working-gas in the communicating passages. The action of this pressure is exerted directly upon the seat-plate to force it against the bearing-face of the valve, and thereby keep the valve and its bearing-seats in close joint-forming contact. To secure a perfect joint between the case and the projection of the seat-plate, I cover the joint of such projection with a flexible diaphragm, $h$, bound by a screw-nut, $h'$, upon the end of such projection $h^2$, and secured at its outer edge upon the case by a separate passage-forming piece, $h^3$, secured by bolts. This diaphragm $h$, being flexible, not only seals the joining of the seat-plate with the case, but moves with any movement of the seat-plate, and thereby does not interfere with the self-adjusting movement of the latter. The outlet side of the valve has a bearing upon the seat-plate $c$, (shown in Figs. 4 and 11,) and has, like the other seat-plates, an extension, $h^2$, but requires no joint-sealing diaphragm, because the pressure of the escaping gases is comparatively slight. The seat-plate $a$ has four ports, as follows: a port, $a'$, communicating by the passage C with the combustion-chamber C'; a lighter-port, $a^2$, in communication with the external lighter-jet, $z$, (shown in Fig. 5;) a port, $a^3$, in communication by the opening $a^4$ with the outer air, as seen in Figs. 1 and 10; a port, $a^5$, opening into the cylinder-port C and supplying gas to the lighter, the supply being determined by regulating the screw-cock $a^6$, Figs. 1, 2, 3, as may be required. The seat-plate $b$ has a port, $b'$, opening into the inlet, while the plate $c$ has a port, $c'$, which opens into the outlet E. The rolls $g$ are used to prevent all wear and friction between the valve and the case on two sides, the only resistance to the valve being the friction between the valve and its seats, and this is reduced to a minimum in the following manner: I cause the same pressure that acts between the faces of the valve to act also as a counter-pressure upon the seat-plate projection, and by limiting the area of the bearing-surfaces of the seat-plates upon which the pressure can act to separate the parts. It is therefore only necessary to provide a small area for the counter-pressure to balance the separating-pressure. Hence having thus established a definite proportional relation between the areas subjected to pressure, no variation in the pressure of the gases will alter this relation between the face and counter pressures, since they are each due to the pressure in the same passage. This limiting of the area subjected to pressure is effected as follows, viz:

The pressure upon the plunger projection tends to force the seat-plate against the valve at the same time the pressure of the gases is exerted to force itself between the valve and its seat, tending thereby to separate them. The degree of this latter pressure depends upon the tightness of the fit between the bearing-faces, and also upon the extent of the bearing-surface. If the surface around the edges of the port formed a perfect joint, the pressure of the gases could not extend beyond this joint-forming surface; but if, as is the usual case in practice, the fit is more or less imperfect over the whole surface, the gases under pressure will follow along between these surfaces, and the amount of pressure at any point will depend upon the resistance which it has in passing between the surfaces from the edge of the port, and also with the ease with which it can escape from this point to the outer edge of the surfaces in contact; hence the area over which this separating-pressure would act will be variable and indeterminate, if provision were not made to limit the area of surface over which this pressure shall act. Otherwise more counter-pressure would be required to make it certain that the bearing-faces would never separate. This area-limiting provision I will now describe. Channels or grooves $i\ i$ are formed across the surface of the seat-plates $a\ b$, on each side of and a suitable distance from the ports $a'$ and $b'$, across which the pressure of the gas cannot pass from the inlet, but must escape to the sides without exerting any further pressure between the valve and its seat. The idea is to surround the port with a groove or channel, $i$, through which all the leakage from the port may escape from a tight joint. In fact, this surface-groove provision forms a barrier beyond which the pressure from leakage from the port cannot act to separate the valve from its seat, and while I prefer to make this provision in the seat-plate, it may be made in the valve-face. The bearing-surface of the seat-plate is thus divided into two parts—the inner part around the port, which is only of sufficient extent to enable the valve to perform its function, and the outer part, which mainly sustains the wearing action of the valve. By this construction I obtain the advantage of a small joint-forming bearing and a large wearing-surface, and it is thereby only necessary to provide a small area for the counter-pressure to keep the joint-forming surfaces always in contact.

The valve being in the position shown in Fig. 2, the charge from the supply-pipe F enters through ports and passages $b'$, $d'$, $a'$, and C to the combustion-chamber, and a portion of the charge enters the ignition-chamber $e'$ through ports and passages $a^5\ d^6$, and is ignited through the port $a^2$ by the permanent external lighter-jet, $z$. The valve now moves to the position shown in Fig. 1, closing communication with the inlet $b'$ and opening communication between the lighter-port $d^2$ and the cylinder-port $a'$, (shown in Fig. 4,) igniting the charge. When the piston has completed its forward stroke, the valve moves to the position shown in Fig. 3, and the waste gases escape through the ports and passages $a'$, $d^3$, $c'$, and E. The next movement of the valve returns it to the position shown in Fig. 2, ready to admit a new charge, and at the same time opening the communication between the ports $d^5$ and $a^3$, allowing the escape of the waste gases contained in the lighter-chamber, through ports and passages $e^2$, $d^5$, $a^3$, and $a^4$, into the outer air.

As the valve moves to the position Fig. 1, port $d^6$ gradually closes port $a^2$ and opens port $a'$ just after port $d^2$ has closed port $a^2$, and while the valve is traveling over the space separating ports $a^2\ a'$ the jet-passage $d^6$ is being supplied directly from port $a'$, and the lighter-chamber $e'$ is thus filled with gas having the same pressure as the chamber C, so that when the port $d^2$ opens port $a'$ the pressure in the two chambers $e'$ and C will be equal; but since the gases in the lighter-chamber have acquired a very high rotary velocity the flame in said chamber will continue to burn until the ports $d^2$ and $a'$ are open wide enough for the flame to ignite the charge.

It will be understood that my invention is not limited to the precise devices or combinations of devices described, as equivalent structures may be employed without departing either from the spirit or scope of my present invention.

Certain features of invention, illustrated or described in this application, but not claimed herein, are made the subject of other applications pending.

I claim—

1. The combination, with the external igniting device of a gas-engine, of a valve having a circular lighter-jet chamber having a gas-supply port entering into said chamber tangentially, for the purpose of giving a whirling motion in a circular path to the lighting jet within the lighter-chamber.

2. The combination, with a gas engine having a permanent lighter device, of a lighter-jet chamber of circular form having a tangential gas-supply port and a central end lighter-port, for the purpose stated.

3. The combination, with a gas-engine having a permanent lighter-jet, of a slide-valve having a circular lighter-chamber having a gas-supply port entering said chamber tangentially, and a central end lighter-port of less area than the said chamber, for the purpose stated.

4. The combination, with a gas-engine having a fixed lighter-jet, of a slide-valve having three port-faces, a circular lighter-jet chamber, $e'$, having a tangential gas-supply port, $d^6$, a central end lighter-port, $d^2$, a central back end port, $e^2$, discharge-ports $d^5\ a^3$, operating in connection with said chamber, and a supply-port, $a^5$, operating in connection with the tangential supply-port.

5. The combination, with a gas-engine having a permanent igniting device, of a slide-valve having three port-operating faces, and a circular lighter-jet chamber having a tangential gas supply port.

6. The combination, with a gas-engine having a permanent external igniting device, of a slide-valve having a lighter-chamber of circular form supplied by a tangential port placed between the supply and the discharge ports $d'\ d^3$, substantially as described.

7. The combination, with a gas-engine, of a slide-valve having three port-operating faces, and an igniting-chamber of circular form having a tangential supply-port, substantially as described.

8. The combination, with a slide-valve, of a seat therefor having grooves in its bearing-face surrounding its case-ports, and the exhaust port or passage communicating therewith, whereby the leakage from said case port is carried to the exhaust and the pressure between the bearing-faces of said seat and valve confined to a limited area of the valve surface, and thereby reduce the force tending to separate their surfaces.

9. The combination, with the slide-valve B, of a movable seat-plate therefor having a port-forming-plunger projection, $h^2$, the flexible joint sealing diaphragm $h$, its binding-nut $h'$, and the passage-forming piece $h^3$, whereby said diaphragm is secured to the movable valve-seat plunger and to the fixed valve case to seal the joining of these parts, substantially as described, for the purpose specified.

10. The combination, with a slide valve having three port-operating faces, of movable seat-plates for two of said port-faces, each having a port-forming-plunger projection, joint-closing diaphragms for said plunger projections, and bearing rolls for the two other faces of said valve, substantially as described, for the purpose specified.

11. The combination, with a slide-valve maintained upon its port bearing-seats by a counter-pressure, of one or more surface grooves or channels surrounding the ports in the bearing surface, whereby to limit the extent of the valve bearing-surface upon which pressure can act to separate the bearing-surfaces, substantially as described, for the purpose specified.

12. The slide valve herein described, having the ports and passages $d'\ d^2\ d^3\ d^5\ d^6$, and the circular lighter-jet chamber $e'$, having the central back port, $e^2$, in combination with the supply-cylinder and exhaust ports, and an external permanent lighter-jet, $z$, substantially as herein set forth.

13. The combination, with a gas-engine, of a slide-valve having ports in three faces, the ports in one face operating the cylinder-supply port, the ports in the other face operating the supply-port for the combustible mixture, and the third face having the discharge-port, substantially as described.

14. The combination, with a gas-engine having a permanent external burner, of a slide-valve having an internal jet-chamber placed between the exhaust port and the supply-port in said valve, substantially as described.

15. The combination, with a slide-valve, of a movable seat-plate therefor having a port surrounded by an extended passage leading to said port and forming a joint-forming seal between the valve-case and the extension with which the said passage is formed, substantially as described.

16. An ignitor device for gas-engines, consisting of a chamber having a central port leading to the external air, through which the gas is ignited, and a tangential supply-passage for the introduction of gases, substantially as described.

17. An igniting device consisting of an ignition-chamber having an orifice entering said chamber on one side for the introduction of gases, so as to produce a whirling flame in said chamber, substantially as described.

18. An ignitor device consisting of a chamber having a central port communicating with a lighting device, combined with a device for causing a whirling jet of gases within said chamber, substantially as described.

19. In a gas-engine, a valve containing an igniting-chamber, and a device for causing a whirling jet of gases within said chamber, substantially as described.

20. In a gas-engine, the combination of a power-chamber in valved communication with a lighter device, an ignition-chamber provided with a tangential supply-passage establishing communication with said power-chamber, and a device for causing a whirling jet of gases within said chamber, substantially as described.

In testimony whereof I have hereunto set my hand in the presence of two subscribing witnesses.

LEWIS HALLOCK NASH.

Witnesses:
A. E. H. JOHNSON,
J. W. HAMILTON JOHNSON.